US012500462B2

United States Patent
Ishihara et al.

(10) Patent No.: US 12,500,462 B2
(45) Date of Patent: Dec. 16, 2025

(54) ROTOR ASSEMBLY

(71) Applicant: BorgWarner Inc., Auburn Hills, MI (US)

(72) Inventors: Mitsuru Ishihara, Kanagawa (JP); Andreas WP Mayer, Clarkston, MI (US); Calahan B. Campton, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 601 days.

(21) Appl. No.: 17/957,019

(22) Filed: Sep. 30, 2022

(65) Prior Publication Data

US 2024/0113582 A1     Apr. 4, 2024

(51) Int. Cl.
*H02K 1/27*       (2022.01)
*H02K 1/04*       (2006.01)
*H02K 1/24*       (2006.01)
*H02K 1/276*      (2022.01)
*H02K 1/28*       (2006.01)
(Continued)

(52) U.S. Cl.
CPC ................. *H02K 1/28* (2013.01); *H02K 1/04* (2013.01); *H02K 1/24* (2013.01); *H02K 1/276* (2013.01); *H02K 7/116* (2013.01); *H02K 21/14* (2013.01)

(58) Field of Classification Search
CPC .. H02K 1/28; H02K 1/04; H02K 1/24; H02K 1/276; H02K 7/116; H02K 21/14; H02K 1/32; H02K 1/2766
See application file for complete search history.

(56) References Cited

U.S. PATENT DOCUMENTS 6,047,461 A * 4/2000 Miura ................... H02K 21/12
                                                310/156.28
8,728,375 B2   5/2014 Matsubayashi et al.
(Continued)

FOREIGN PATENT DOCUMENTS

CN      105099041 A    11/2015
CN      114938694 A     8/2022
(Continued)

OTHER PUBLICATIONS

International Search Report for Application No. PCT/US2023/030803 dated Dec. 8, 2023, 3 pages.
(Continued)

*Primary Examiner* — Thomas Truong
(74) *Attorney, Agent, or Firm* — Howard & Howard Attorneys PLLC

(57) ABSTRACT

A rotor assembly for an electric motor includes a shaft, a lamination stack, a plurality of magnets including a first magnet, and a plurality of pole pieces including a first pole piece. The first magnet is disposed between the lamination stack and the first pole piece, and each pole piece has an outer pole surface. The rotor assembly also includes a sleeve including an outer sleeve body disposed about the outer pole surface of each pole piece to retain each of the pole pieces with respect to the lamination stack, and a plurality of spacers extending from the outer sleeve body radially inward toward the shaft. The plurality of spacers includes a first and second spacer, and the first and second spacers are disposed between the first pole piece and the lamination stack to reduce flux leakage of the first magnet.

21 Claims, 5 Drawing Sheets

(51) Int. Cl.
*H02K 7/116* (2006.01)
*H02K 21/14* (2006.01)

(56) References Cited

U.S. PATENT DOCUMENTS

| | | | |
|---|---|---|---|
| 2005/0140230 A1* | 6/2005 | Johnson | H02K 29/10 |
| | | | 903/917 |
| 2008/0179980 A1* | 7/2008 | Dawsey | H02K 1/2766 |
| | | | 310/156.53 |
| 2012/0074807 A1* | 3/2012 | Burton | H02K 1/2753 |
| | | | 310/156.28 |
| 2013/0026872 A1 | 1/2013 | Cirani et al. | |
| 2015/0130318 A1 | 5/2015 | Kitada et al. | |
| 2015/0303753 A1 | 10/2015 | Huang et al. | |
| 2018/0287439 A1 | 10/2018 | Degner et al. | |
| 2018/0358852 A1 | 12/2018 | Roopnarine | |
| 2019/0238016 A1* | 8/2019 | Paweletz | F04D 13/06 |
| 2020/0266677 A1 | 8/2020 | Tago et al. | |
| 2021/0075280 A1 | 3/2021 | Leonardi et al. | |
| 2022/0399768 A1* | 12/2022 | Aso | F04D 13/0633 |

FOREIGN PATENT DOCUMENTS

| | | |
|---|---|---|
| CN | 115118045 A * | 9/2022 |
| DE | 102015203018 A1 | 8/2016 |
| DE | 102016219120 A1 | 4/2018 |
| DE | 102019127583 A1 | 4/2021 |
| JP | H05292690 A | 11/1993 |
| JP | 2012147644 A | 8/2012 |
| WO | 2018171973 A1 | 9/2018 |
| WO | 2021225902 A1 | 11/2021 |

OTHER PUBLICATIONS

Machine-assisted English language abstract and machine-assisted English language translation for DE 10 2015 203 018 A1 extracted from espacenet.com database on Dec. 30, 2023, 17 pages.
Machine-assisted English language abstract and machine-assisted English language translation for DE 10 2019 127 583 A1 extracted from espacenet.com database on Dec. 30, 2023, 15 pages.
English language abstract and machine-assisted English language translation for JP 2012-147644 A extracted from espacenet.com database on Dec. 30, 2023, 16 pages.
U.S. Appl. No. 17/957,065, filed Sep. 30, 2022.
U.S. Appl. No. 17/957,110, filed Sep. 30, 2022.
International Search Report for Application No. PCT/US2023/030819 dated Nov. 29, 2023, 2012, 3 pages.
English language abstract for CN 105099041 A extracted from espacenet.com database on Dec. 10, 2023, 1 page.
English language abstract for CN 114938694 A extracted from espacenet.com database on Dec. 10, 2023, 2 pages.
Machine-assisted English language abstract and machine-assisted English language translation for DE 10 2016 219 120 A1 extracted from espacenet.com database on Dec. 10, 2023, 18 pages.
International Search Report for Application No. PCT/US2023/030812 dated Dec. 8, 2023, 2 pages.
English language abstract and machine-assisted English language translation for WO 2018/171973 A1 extracted from espacenet.com database on Sep. 16, 2024, 8 pages.

* cited by examiner

ROTOR ASSEMBLY

BACKGROUND OF THE INVENTION

1. Field of the Invention

The invention generally relates to a rotor assembly for an electric motor and to an electric motor including the rotor assembly.

2. Description of the Related Art

Electric motors include a rotor assembly and a stator disposed about the rotor assembly. Rotor assemblies commonly include a shaft, a lamination stack disposed about the shaft, and a plurality of pole pieces spaced radially from the lamination stack. Typically, permanent magnets are embedded into the rotor assembly, commonly between the lamination stack and plurality of pole pieces, and generate magnetic flux. Stators include coil windings, and energization of the coil windings in the stator generates magnetic flux which interacts with the magnetic flux generated by the permanent magnets to impart a force which causes the rotor assembly to rotate.

Typically, the lamination stack and the plurality of pole pieces are physically connected to one another through a plurality of bridges, thus forming what is commonly referred to as a bridged rotor assembly. Each bridge is unitary with both the lamination stack and one of the plurality of pole pieces and is typically comprised of the same material as the lamination stack and the plurality of pole pieces. The bridge prevents the plurality of pole pieces from moving away from the lamination stack due to centrifugal forces imparted on the plurality of pole pieces during rotation of the rotor assembly.

However, the magnetic flux generated by the permanent magnets is disrupted, or leaked, by the bridge so that a portion of the magnetic flux is directed toward the lamination stack and connects the north and south pole of each permanent magnet. Leaked magnetic flux limits the amount of magnetic flux from the permanent magnets available to interact with the magnetic flux generated by the coil windings of the stator, thus lowering the force imparted to the rotor assembly and thus also lowering the efficiency of the electric motor. Leakage of magnetic flux will occur until the bridge reaches magnetic saturation. To minimize leakage of flux through the bridge, the bridge is typically designed to be as thin as possible to quickly reach magnetic saturation within the lamination stack and therefore reduce flux leakage of the permanent magnets. However, the centrifugal forces imparted to the plurality of pole pieces by rotation of the rotor assembly are also imparted to the bridge. These centrifugal forces imparted to the bridge result in a concentration of stress on the bridge and risk structural failure of the bridge, particularly when the bridge has been designed to be as thin as possible.

As such, there remains a need to provide an improved rotor assembly for an electric motor.

SUMMARY OF THE INVENTION AND ADVANTAGES

A rotor assembly for an electric motor is disclosed. The rotor assembly includes a shaft extending along and rotatable about an axis. The rotor assembly also includes a lamination stack coupled to the shaft, a plurality of magnets including a first magnet coupled to the lamination stack, and a plurality of pole pieces spaced radially outward from the shaft. The plurality of pole pieces includes a first pole piece, and the first magnet is disposed between the lamination stack and the first pole piece. Each pole piece of the plurality of pole pieces has an outer pole surface facing away from the axis.

The rotor assembly further includes a sleeve including an outer sleeve body and a plurality of spacers. The outer sleeve body of the sleeve is disposed about the outer pole surface of each pole piece of the plurality of pole pieces to retain each of the pole pieces with respect to the lamination stack. The plurality of spacers extends from the outer sleeve body radially inward toward the shaft. The plurality of spacers includes a first spacer and a second spacer, and the first spacer and the second spacer are disposed between the first pole piece and the lamination stack to reduce flux leakage of the first magnet.

The outer sleeve body retains the first pole piece with respect to the lamination stack thereby preventing the first pole piece from moving away from the lamination stack when centrifugal forces are imparted on the first pole piece by rotation of the rotor assembly. Moreover, the outer sleeve body, the first spacer, and the second spacer prevent disruption, or leakage, of magnetic flux of the first magnet. As such, the magnetic flux of the first magnet is ensured to be available to efficiently impart a force to the rotor assembly to rotate the rotor assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
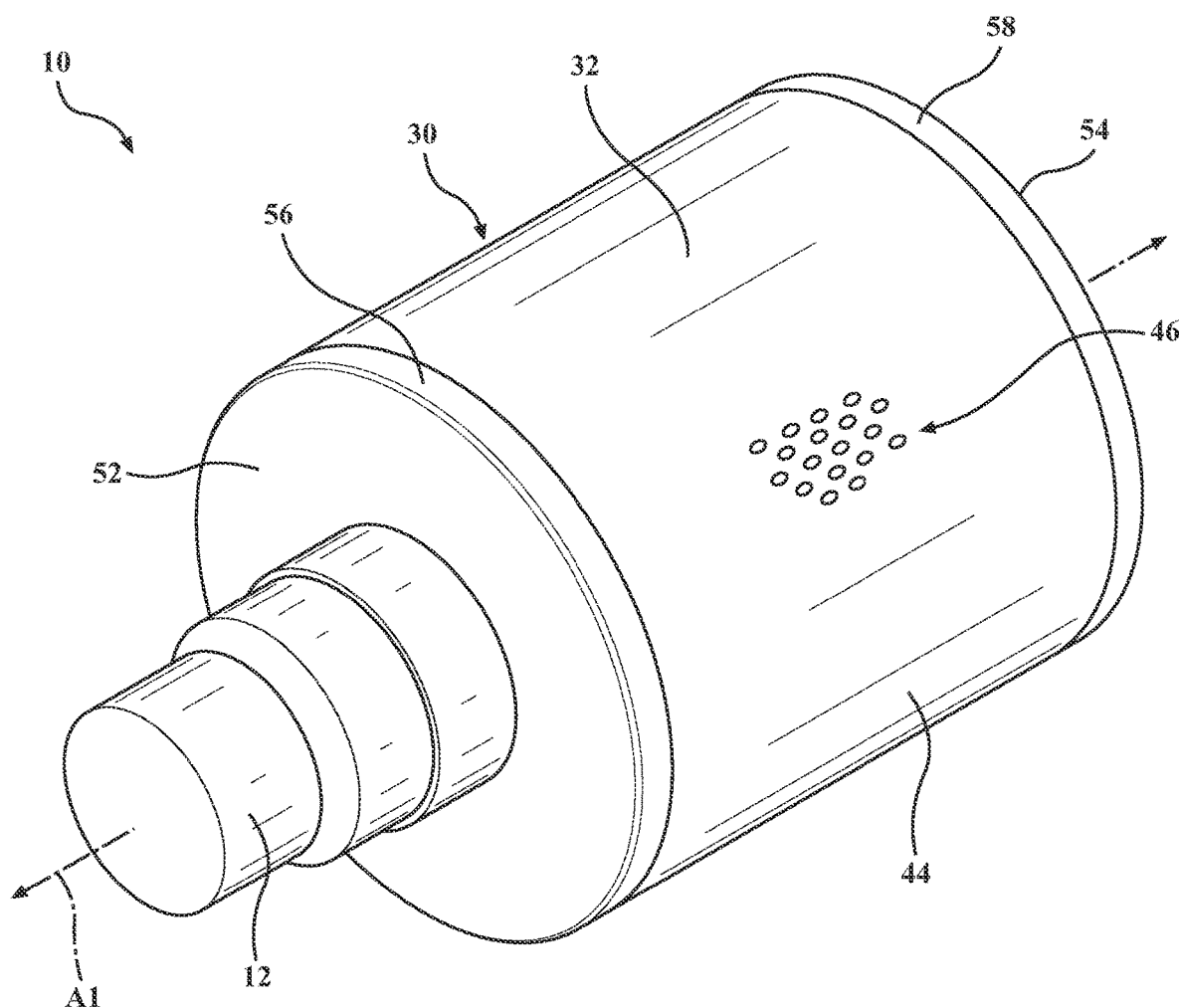
FIG. 1 is a perspective view of a rotor assembly according to the invention.

With reference to the Figures, wherein like numerals indicate like parts throughout the several views, a rotor assembly 10 for an electric motor 12 is shown throughout FIGS. 1-6. The rotor assembly 10 includes a shaft 14 extending along and rotatable about an axis A1. The rotor assembly 10 also includes a lamination stack 16 coupled to the shaft 14, a plurality of magnets 18 including a first magnet 20 coupled to the lamination stack 16, and a plurality of pole pieces 24 spaced radially outward from the shaft 14. Although not required, the plurality of magnets 18 may also include a second magnet 22 coupled to the lamination stack 16. The plurality of pole pieces 24 includes a first pole piece 26. It is to be appreciated that the plurality of pole pieces 24 may be referred to as a plurality of pole shoes. The first magnet 20 is disposed between the lamination stack 16 and the first pole piece 26. In embodiments with the second magnet 22, the second magnet 22 is disposed between the lamination stack 16 and the first pole piece 26. Each pole piece of the plurality of pole pieces 24 has an outer pole surface 28 facing away from the axis A1.

The rotor assembly 10 further includes a sleeve 30 including an outer sleeve body 32 and a plurality of spacers 34. The outer sleeve body 32 of the sleeve 30 is disposed about the outer pole surface 28 of each pole piece 24 of the plurality of pole pieces 24 to retain each of the pole pieces 24 with respect to the lamination stack 16. The plurality of spacers 34 extend from the outer sleeve body 32 radially inward toward the shaft 14. The plurality of spacers 34 include a first spacer 36 and a second spacer 38, and the first spacer 36 and the second spacer 38 are disposed between the first pole piece 26 and the lamination stack 16 to reduce flux leakage of the first magnet 20.

The outer sleeve body 32 retains the first pole piece 26 with respect to the lamination stack 16 thereby preventing the first pole piece 26 from moving away from the lamination stack 16 when centrifugal forces are imparted on the first pole piece 26 by rotation of the rotor assembly 10. Moreover, the outer sleeve body 32, the first spacer 36, and the second spacer 38 prevent disruption, or leakage, of magnetic flux of the first magnet 20. As such, the magnetic flux of the first magnet 20 is ensured to be available to efficiently impart a force to the rotor assembly 10 to rotate the rotor assembly 10.

Although the benefits of the outer sleeve body 32, the first spacer 36, and the second spacer 38 have been described with reference to the first pole piece 26, the first magnet 20, optionally the second magnet 22, and the lamination stack 16, it is to be appreciated that these benefits may apply equally to all other spacers 34 of the plurality of spacers 34, all other pole pieces 24 of the plurality of pole pieces 24, all other magnets 18 of the plurality of magnets 18, and the lamination stack 16. Each spacer 34 and pole piece 24 may have the characteristics of the first spacer 36, the second spacer 38, and the first pole piece 26 as described herein. More specifically, the outer sleeve body 32 may retain each of the pole pieces 24 with respect to the lamination stack 16 thereby preventing the plurality of pole pieces 24 from moving away from the lamination stack 16 when centrifugal forces are imparted on each pole piece 24 by rotation of the rotor assembly 10. Moreover, the outer sleeve body 32 and the plurality of spacers 34 prevents disruption, or leakage, of magnetic flux between the plurality of pole pieces 24 and the lamination stack 16. As such, the magnetic flux is ensured to be available to efficiently impart a force to the rotor assembly 10 to rotate the rotor assembly 10.

The lamination stack 16 may be manufactured from a plurality of laminations which are fixed to one another, in non-limiting examples by interlocking, welding, clamping, and/or bonding. To improve manufacturability of the lamination stack 16, each lamination of the lamination stack 16 may be the same as every other lamination in the lamination stack 16.

Figure 3:
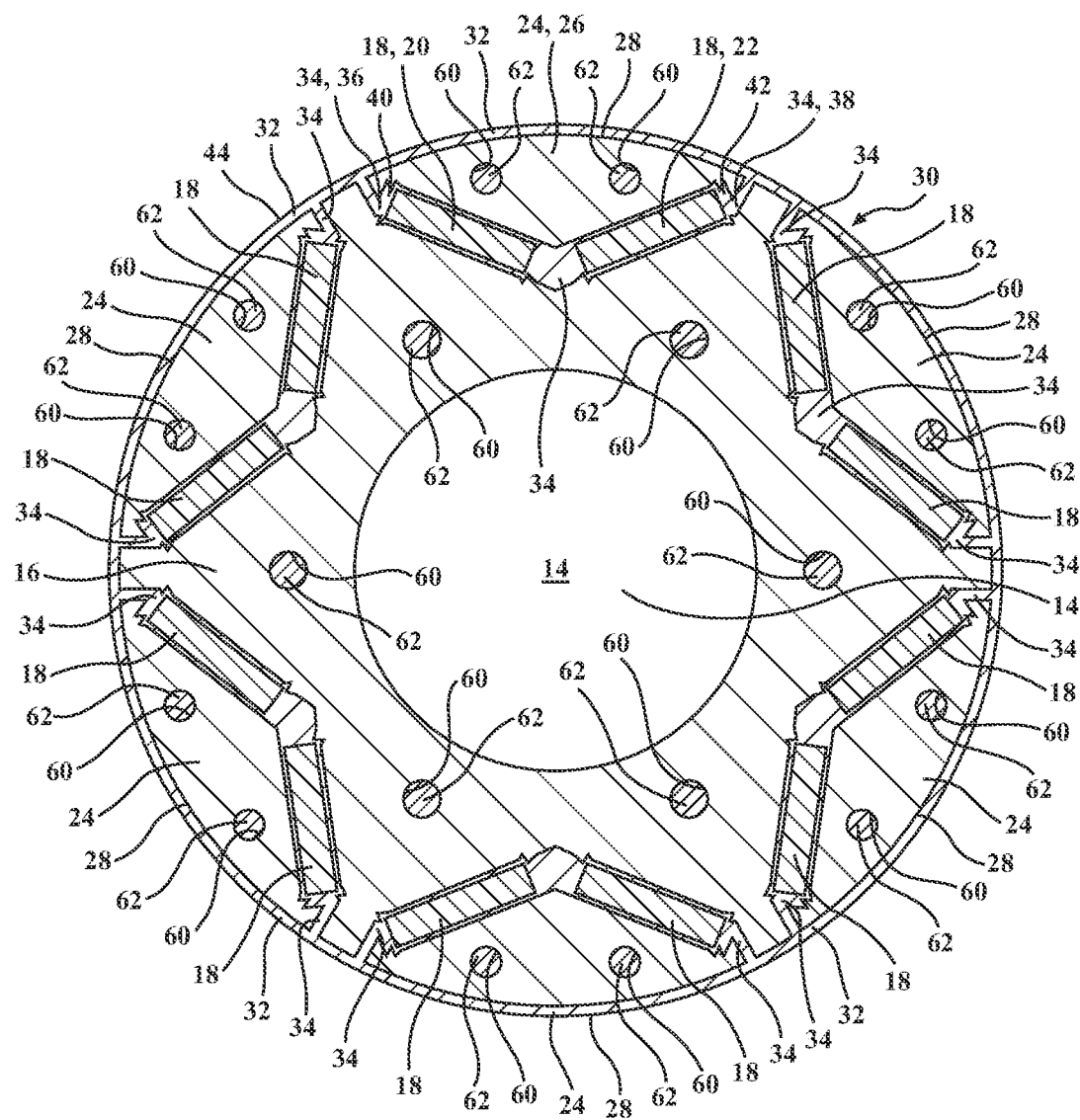
FIG. 3 is another cross-sectional view of the rotor assembly of FIG. 1, with the rotor assembly including a lamination stack, a plurality of pole pieces, a plurality of magnets, and a sleeve including an outer sleeve body and a plurality of spacers.

Each magnet of the plurality of magnets 18, including the first magnet 20 and the second magnet 22, may be a permanent magnet. The first magnet 20 and the second magnet 22 may be configured to form a V-shape, as shown in FIG. 3. Each pole piece of the plurality of pole pieces 24, including the first pole piece 26, may be comprised of metals and/or metalloids including, but not limited to, iron, cobalt, nickel, silicon, manganese, aluminum, steel including electrical steel, and combinations thereof. The lamination stack 16 may be comprised of metals and/or metalloids including, but not limited to, iron, cobalt, nickel, silicon, manganese, aluminum, steel including electrical steel, and combinations thereof. Although not required, it is to be appreciated that the plurality of pole pieces 24 may be comprised of the same metal and/or metalloids that the lamination stack 16 is comprised of.

Although not required, the sleeve 30 may comprise a polymeric material. In non-limiting examples, the polymeric material of the sleeve 30 may be a thermoplastic, a thermoset, or an elastomer. The polymeric material of the sleeve 30 may be an engineering plastic. More specifically, the polymeric material of the sleeve 30 may be, but is not limited to, any polyalkene or polyolefin including copolymers and terpolymers thereof such as polyethylene including high-density polyethylene (HDPE) and low-density polyethylene (LDPE), polypropylene (PP), polybutylene and polybutylene terephthalate (PBTR), acrylics such as acrylonitrile butadiene styrene (ABS) or polymethylmethacrylate (PMMA), polyoxymethylene (POM) or any acetal copolymers or acetal terpolymers, polyketones, polyetherketones, and/or polyaryletherketones such as polyetheretherketone (PEEK) and polyetherketoneketone (PEKK), polyetherimide (PEI), polyimides, polyvinylchloride (PVC), polyphenylene sulfide (PPS), polyphenylene oxide (PPO), polysulphone (PSU), polytetrafluoroethylene (PTFE), polyamides including polyphthalamide, polycarbonates, urethanes, epoxies, and thermoplastic elastomers (TPE). Although not required, the polymeric material of the sleeve 30 may be molded, such as over-molded, insert molded, injection molded, compression molded, and thermoformed.

The sleeve 30 may also comprise a first composition including any of the polymeric materials detailed herein as well as optional fillers and/or additives, such as plasticizers, carbon including carbon fiber, ceramic materials and/or minerals including calcium carbonate, silica, clay, and kaolin, fibers including glass fibers, carbon fibers, aramid fibers, basalt fibers, and paper fibers, stabilizers including oxidation stabilizers, ultraviolet (UV) stabilizers, heat stabilizers, light absorbers, strengtheners, acid scavengers, metal deactivators, and flame retardants including aluminum hydroxide, phosphorus compounds, and brominated compounds.

The plurality of pole pieces 24 may be separate from the lamination stack 16. In other words, each pole piece 24 of the plurality of pole pieces 24 may be separate components from the lamination stack 16, and thus form a bridgeless arrangement of the pole pieces 24 and the lamination stack 16. In other words, in the bridgeless arrangement, the pole pieces 24 and the lamination stack 16 are not connected to one another through a bridging material. In this embodiment, the centrifugal forces imparted to the plurality of pole pieces 24 by rotation of the rotor assembly 10 are not also imparted to any bridge connecting the plurality of pole pieces 24 and the lamination stack 16. Thus, the bridgeless arrangement of the pole pieces 24 and the lamination stack 16 removes concern for centrifugal forces imparting a force on any bridge, resulting in a concentration of stress on any bridge, and potentially resulting in structural failure of any bridge.

The outer sleeve body 32 of the sleeve 30 and the plurality of spacers 34 of the sleeve 30 may be unitary. In other words, the outer sleeve body 32 of the sleeve 30 and the plurality of spacers 34 of the sleeve 30 may be integral with one another (i.e., one-piece). The outer sleeve body 32 of the sleeve 30 and the plurality of spacers 34 of the sleeve 30 may be integrally formed together to be unitary or may be formed separately and later joined to become unitary.

Although not required, the first spacer 36 may extend at least to the first magnet 20 and the second spacer 38 may extend at least to the second magnet 22. The first spacer 36 and the second spacer 38 may also be disposed between the first magnet 20 and the second magnet 22. It is to be appreciated that the first spacer 36 may extend from the outer sleeve body 32 radially inward toward the first magnet 20 and may also extend past the first magnet 20, optionally encapsulating at least a portion of the first magnet 20, to then be disposed between the first magnet 20 and the second magnet 22. Similarly, it is to be appreciated that the second spacer 38 may extend from the outer sleeve body 32 radially inward toward the second magnet 22 and may also extend past the second magnet 22, optionally encapsulating at least a portion of the second magnet 22, to then be disposed between the first magnet 20 and the second magnet 22. It is further to be appreciated that both the first spacer 36 and the second spacer 38 may be disposed between the first magnet 20 and the second magnet 22, and may be fixed to one another, made unitary, or otherwise joined between the first magnet 20 and the second magnet 22.

The first spacer 36 may extend from the outer sleeve body 32 radially inward toward the shaft 14. Moreover, as shown in FIG. 3, the first pole piece 26 may define a first recess 40, and the first spacer 36 may be disposed at least partially in the first recess 40 to further couple the sleeve 30 and the first pole piece 26. The first spacer 36 may have a hooked configuration and may extend radially away from the shaft 14 to be disposed in the first recess 40 of the first pole piece 26. The first recess 40 may be disposed adjacent to the first magnet 20. The second spacer 38 may extend from the outer sleeve body 32 radially inward toward the shaft 14. Moreover, as also shown in FIG. 3, the first pole piece 26 may define a second recess 42, and the second spacer 38 may be disposed at least partially in the second recess 42 to further couple the sleeve 30 and the first pole piece 26. The second spacer 38 may have a hooked configuration and may extend radially away from the shaft 14 to be disposed in the second recess 42 of the first pole piece 26. The second recess 42 may be disposed adjacent to the second magnet 22.

The outer sleeve body 32 has an outer sleeve surface 44 facing away from the axis A1. The outer sleeve surface 44 is in contact with air during rotation of the rotor assembly 10. The outer sleeve surface 44 may be smooth to reduce air friction. Alternatively, the outer sleeve body 32 includes an aerodynamic feature 46 indented into the outer sleeve surface 44 to reduce air friction. The aerodynamic feature 46 may include, but is not limited to, a groove, a series of grooves, a dimple, or a series of dimples.

The lamination stack 16 extends along the axis A1 between a first lamination stack end 48 and a second lamination stack end 50. The rotor assembly 10 may further include a first end cap 52 adjacent to the first lamination stack end 48 and a second end cap 54 adjacent to the second lamination stack end 50. The first end cap 52 and the second end cap 54 assist in preventing the plurality of magnets 18 from being dispelled from between the plurality of pole pieces 24 and the lamination stack 16.

The first end cap 52 has a first end cap outer surface 56 facing away from the axis and the second end cap 54 has a second end cap outer surface 58 facing away from the axis A1. Although not required, the outer sleeve surface 44, the first end cap outer surface 56, and the second end cap outer surface 58 may be flush with one another. Said differently, the outer sleeve surface 44, the first end cap outer surface 56, and the second end cap outer surface 58 may all extend the same radial distance away from the axis A1 and may form a single continuous surface. Additionally, the single continuous surface formed by the outer sleeve surface 44, the first end cap outer surface 56, and the second end cap outer surface 58 may not deviating from the same radial distance away from the axis A1 as the first end cap 52, the outer sleeve body 32, and the second end cap 54 extend along the axis A1. A single, continuous surface aids in manufacturability and aerodynamic performance of the rotor assembly 10.

Figure 2:
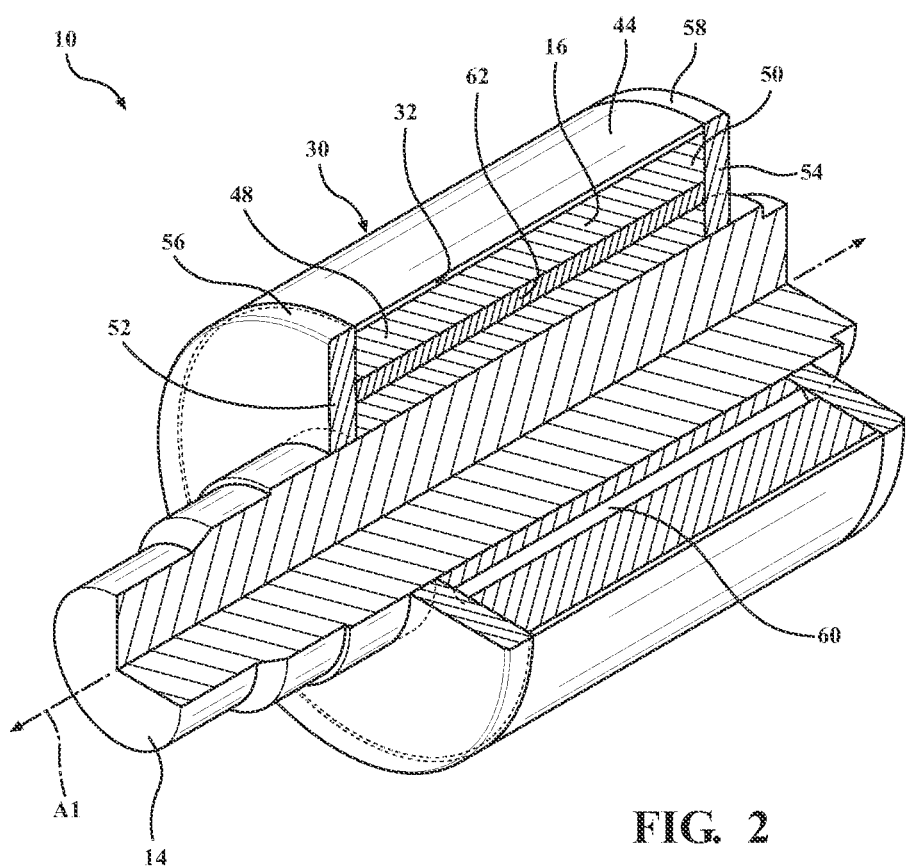
FIG. 2 is a cross-sectional view partially in phantom of the rotor assembly of FIG. 1, with the rotor assembly including a first end cap, a second end cap, and a plurality of rods extending therebetween.
Figure 4:
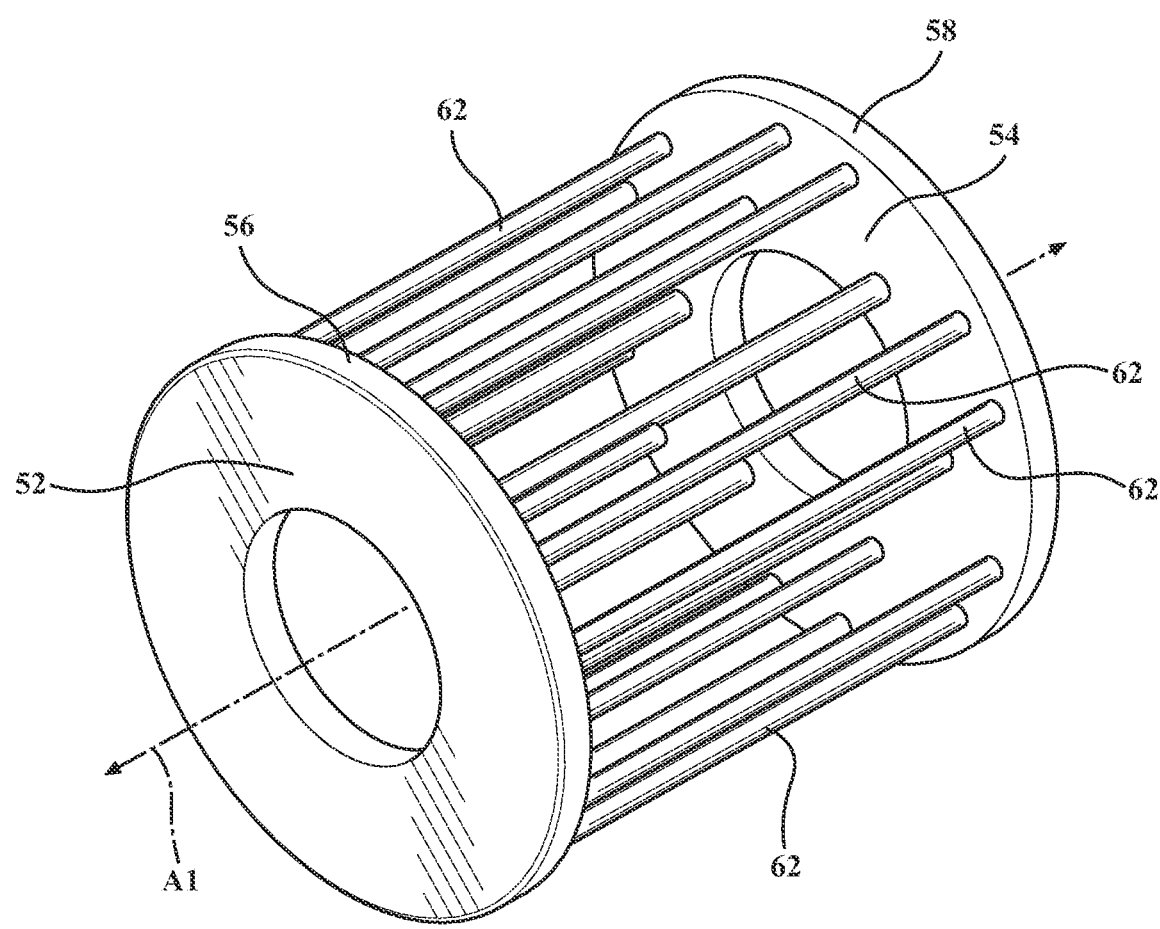
FIG. 4 is a perspective view of the first end cap, the second end cap, and the plurality of rods extending therebetween.

The lamination stack 16 may define a plurality of channels 60 between the first lamination stack end 48 and the second lamination stack end 50. The plurality of channels 60 may be configured to direct lubricant throughout the rotor assembly 10 for lubrication and/or cooling of the rotor assembly 10. The rotor assembly 10 may further include a plurality of rods 62 disposed in the plurality of channels 60, as shown in FIGS. 2 and 3. It is to be appreciated that the plurality of rods 62 may be disposed in the plurality of channels 60 and the lamination stack 16 may still define channels 60 which are configured to direct lubricant throughout the rotor assembly 10 for lubrication and/or cooling of the rotor assembly 10. Alternatively, it is also to be appreciated that one rod 62 of the plurality of rods 62 may correspond to, and be disposed in, one channel of the plurality of channels 60. Although not required, the plurality of rods 62 may be unitary with the first end cap 52 and the second end cap 54, as shown in FIG. 4. Said differently, the plurality of rods 62, the first end cap 52, and the second end cap 54 may be integral with one another (i.e., one-piece). The plurality of rods 62, the first end cap 52, and the second end cap 54 may be formed integrally with one another.

The first end cap 52, the second end cap 54, and/or the plurality of rods 62 may comprise a polymeric material. In the embodiments where the sleeve 30 comprises a polymeric material and the first end cap 52, the second end cap 54, and/or the plurality of rods comprise a polymeric material, it is to be appreciated that these polymeric materials may be the same as each other or may be different from one another. In non-limiting examples, the polymeric material of the first end cap 52, the second end cap 54, and/or the plurality of rods 62 may be a thermoplastic, a thermoset, or an elastomer. The polymeric material of the first end cap 52, the second end cap 54, and/or the plurality of rods 62 may be an engineering plastic.

More specifically, the polymeric material of the first end cap 52, the second end cap 54, and/or the plurality of rods 62 may be, but is not limited to, any polyalkene or polyolefin including copolymers and terpolymers thereof such as polyethylene including high-density polyethylene (HDPE) and low-density polyethylene (LDPE), polypropylene (PP), polybutylene and polybutylene terephthalate (PBTR), acrylics such as acrylonitrile butadiene styrene (ABS) or polymethylmethacrylate (PMMA), polyoxymethylene (POM) or any acetal copolymers or acetal terpolymers, polyketones, polyetherketones, and/or polyaryletherketones such as polyetheretherketone (PEEK) and polyetherketoneketone (PEKK), polyetherimide (PEI), polyimides, polyvinylchloride (PVC), polyphenylene sulfide (PPS), polyphenylene oxide (PPO), polysulphone (PSU), polytetrafluoroethylene (PTFE), polyamides including polyphthalamide, polycarbonates, urethanes, epoxies, and thermoplastic elastomers (TPE). Although not required, the polymeric material of the first end cap 52, the second end cap 54, and/or the plurality of rods 62 may be molded, such as over-molded, insert molded, injection molded, compression molded, and thermoformed.

More specifically, the plurality of rods 62 may be non-magnetic, may be conductive to electricity, and may further include carbon fiber. It is to be appreciated that the first end cap 52 and/or the second end cap 54 may also be non-magnetic, may be conductive to electricity, and may further include carbon fiber. At least one of the first end cap 52 and the second end cap 54 may comprise a second composition. The second composition of the first end cap 52 and/or the second end cap 54 may be the same as, or different from the first composition of the sleeve 30. It is also to be appreciated that the plurality of rods may comprise the second composition such that at least one of the first end cap 52, the second end cap 54, and the plurality of rods 62 may comprise the second composition.

The second composition of the first end cap 52, the second end cap 54, and/or the plurality of rods 62 may include any of the polymeric materials detailed herein as well as optional fillers and/or additives, such as plasticizers, carbon including carbon fiber, ceramic materials and/or minerals including calcium carbonate, silica, clay, and kaolin, fibers including glass fibers, carbon fibers, aramid fibers, basalt fibers, and paper fibers, stabilizers including oxidation stabilizers, ultraviolet (UV) stabilizers, heat stabilizers, light absorbers, strengtheners, acid scavengers, metal deactivators, and flame retardants including aluminum hydroxide, phosphorus compounds, and brominated compounds. In one embodiment, the second composition includes a thermoplastic and a filler encapsulated by the thermoplastic. In this embodiment, the filler may include carbon fiber.

As detailed herein, the sleeve 30 may be molded, such as over-molded, insert molded, injection molded, compression molded, and thermoformed. It is to be appreciated that the first end cap 52, the second end cap 54, and/or the plurality of rods 62 may also be molded, such as over-molded, insert molded, injection molded, compression molded, and thermoformed. More specifically, the polymeric material of the first end cap 52, the second end cap 54, and/or the plurality of rods 62 may be molded. It is to be appreciated that the first end cap 52, the second end cap 54, and the plurality of rods 62 may be molded together. The sleeve 30, the first end cap 52, the second end cap 54, and/or the plurality of rods 62 may be molded together. However, the first end cap 52 and the second end cap 54 may be molded separately from the sleeve 30. Thus, the first end cap 52, the second end cap 54, the plurality of rods 62 may be molded separately from the sleeve 30. The first end cap 52, the second end cap 54, and optionally the plurality of rods 62 may be molded after the sleeve 30 has been molded.

The plurality of pole pieces 24 may include two pole pieces, three pole pieces, four pole pieces, five pole pieces, six pole pieces, seven pole pieces, eight pole pieces, nine pole pieces, ten pole pieces, or more than ten pole pieces. The plurality of magnets 18 may include two magnets, three magnets, four magnets, five magnets, six magnets, seven magnets, eight magnets, nine magnets, ten magnets, eleven magnets, twelve magnets, thirteen magnets, fourteen magnets, fifteen magnets, sixteen magnets, seventeen magnets, eighteen magnets, nineteen magnets, twenty magnets, or more than twenty magnets. Associated with each pole piece 24, the plurality of magnets 18 may be single magnet, or may be multiple barrier pole magnet arrays including but not limited to V-shaped arrays, double V-shaped arrays, U-shaped arrays, and delta shaped arrays. The plurality of channels 60 and the plurality of rods 62 may include two channels and two rods, three channels and three rods, four channels and four rods, five channels and five rods, six channels and six rods, seven channels and seven rods, eight channels and eight rods, nine channels and nine rods, ten channels and ten rods, eleven channels and eleven rods, twelve channels and twelve rods, thirteen channels and thirteen rods, fourteen channels and fourteen rods, fifteen channels and fifteen rods, sixteen channels and sixteen rods, seventeen channels and seventeen rods, eighteen channels and eighteen rods, nineteen channels and nineteen rods, twenty channels and twenty rods, or more than twenty channels and more than twenty rods. Each pole piece 24 may define one channel, may define two channels, may define three channels, or may define more than three channels. The lamination stack 16 may also define the plurality of channels 60, and may define one channel, two channels, three channels, four channels, five channels, six channels, seven channels, eight channels, nine channels, ten channels, or more than ten channels.

The rotor assembly 10 may be configured to rotate at rotational speeds above 20,000 rotations per minute (RPM). In non-limiting examples, the rotor assembly 10 may be configured to rotate between about 20,000 RPM and about 50,000 RPM, between about 20,000 RPM and about 40,000 RPM, between about 20,000 RPM and about 30,000 RPM, and between about 20,000 RPM and about 25,000 RPM. The sleeve 30 may be capable of retaining the plurality of pole pieces 24 to the lamination stack 16 at rotational speeds at, or in excess of, 20,000 RPM. As such, the rotor assembly 10 may be considered a high-speed rotor assembly.

Figure 5:
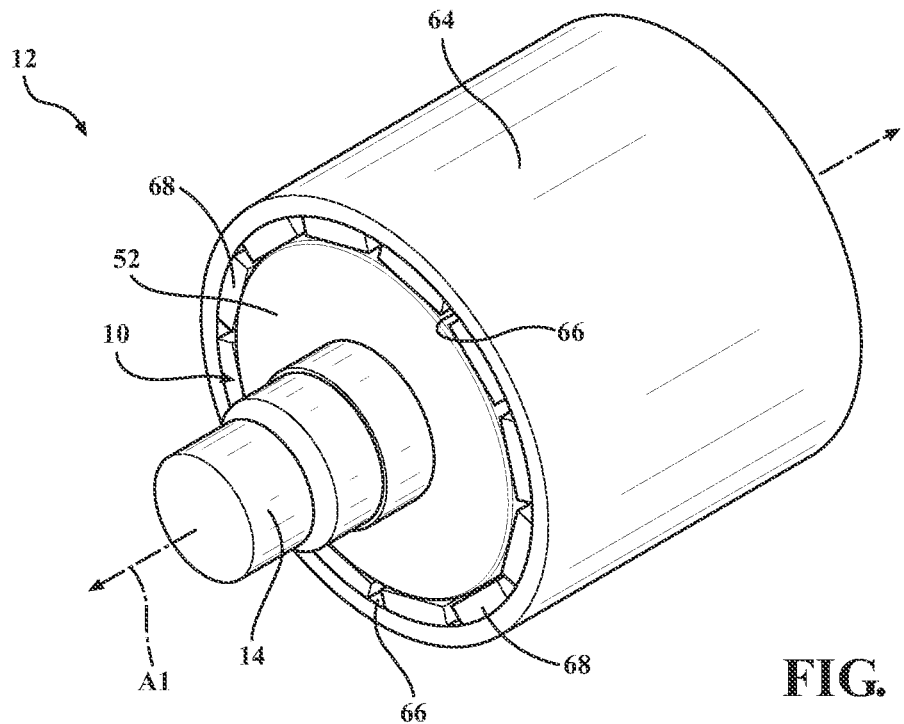
FIG. 5 is a perspective view of an electric motor including the rotor assembly of FIG. 1.

The rotor assembly 10 may be incorporated into an electric motor 12, as shown in FIG. 5. The electric motor 12 includes a stator 64 extending along the axis A1 and defining a stator interior 66, and the rotor assembly 10 may be disposed in the stator interior 66 of the stator 64. The stator 64 may include coil windings 68 that may be energized to generate the magnetic flux detailed herein. The sleeve 30, including the outer sleeve body 32 and the plurality of spacers 34, increases the efficiency of the electric motor 12 by reducing the amount of the magnetic flux that is leaked, thus increasing the efficiency of force imparted to rotate the rotor assembly 10 relative to the amount of magnetic flux required to be generated.

Moreover, a gap may be defined between the outer pole surface 28 the stator interior 66 of the stator 64. It is advantageous to reduce this gap to the extent possible to minimize losses due to air friction and also to increase torque on the rotor assembly 10. It is to be appreciated that the sleeve 30 may be manufactured with relatively tight tolerances, thus permitting a relatively small gap to be defined between the outer sleeve surface 44 of the sleeve 30 and the stator interior 66 of the stator 64, and thus also permitting a relatively small gap to be defined between the outer pole surface 28 and the stator interior 66 of the stator 66, and also thus minimizing losses due to air friction. The gap may be as small as 0.2 millimeters and may scale with the tolerances of the diameter of the rotor assembly 10 and/or scale with the rotational speed of the rotor assembly 10. The gap may also scale on the order of about 0.1% of the diameter of the stator 64.

Figure 6:
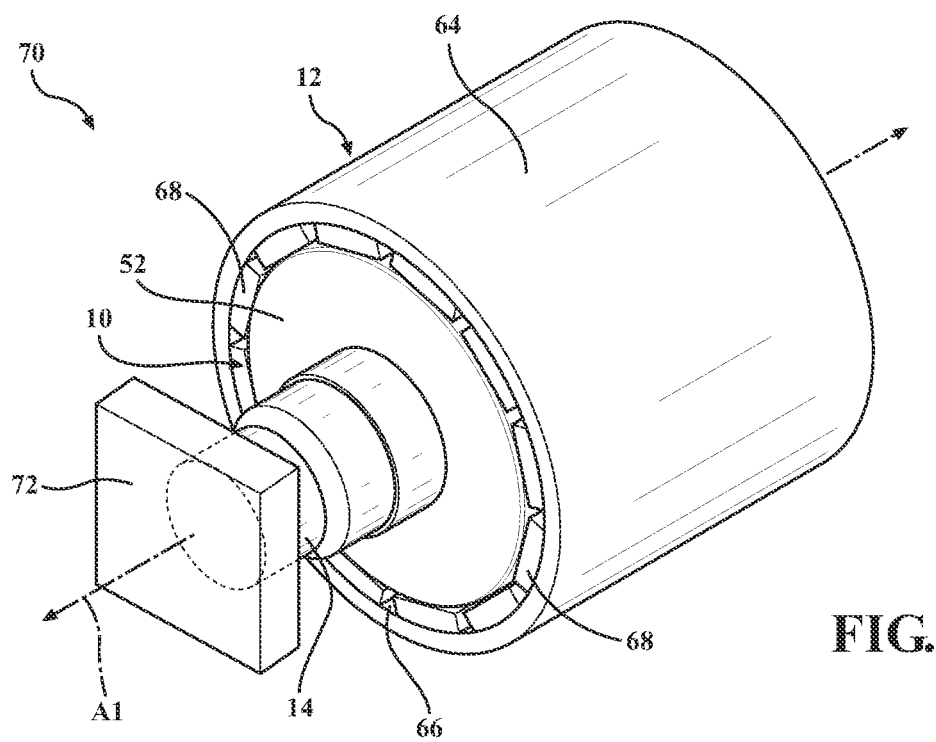
FIG. 6 is a perspective view partially in phantom of an electric drive unit including the electric motor of FIG. 5.

As shown in FIG. 6, the electric motor 12 is incorporated into an electric drive unit 70. The electric drive unit 70 may include the electric motor 12 and a gear reduction mechanism 72 coupled to the shaft 14 of the rotor assembly 10. The gear reduction mechanism 72 may be configured to modulate torque received from the shaft 14. The gear reduction mechanism 72 may be, but is not limited to, a planetary gearset, a reduction gearbox such as a two-stage reduction gearbox, a worm gear reducer, a helical gear reducer, a spur gear reducer, a hypoid gear reducer, a bevel gear reducer, a gear train gear reducer, a cycloidal gear reducer, a magnetic gear reducer, an orthogonal gear reducer, a skew axes gear reducer, a parallel shaft gear reducer, a coaxial gear reducer, and combinations thereof.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A rotor assembly for an electric motor, said rotor assembly comprising:
   a shaft extending along and rotatable about an axis;
   a lamination stack coupled to said shaft;
   a plurality of magnets comprising a first magnet coupled to said lamination stack;
   a plurality of pole pieces spaced radially outward from said shaft and comprising a first pole piece, wherein said first magnet is disposed between said lamination stack and said first pole piece, and wherein each pole piece of said plurality of pole pieces has an outer pole surface facing away from said axis; and
   a sleeve comprising,
      an outer sleeve body disposed about said outer pole surface of each pole piece of said plurality of pole pieces to retain each of said pole pieces with respect to said lamination stack, and
      a plurality of spacers extending from said outer sleeve body radially inward toward said shaft and comprising a first and second spacer, wherein said first and said second spacers are disposed between said first pole piece and said lamination stack to reduce flux leakage of the first magnet;
   wherein said plurality of magnets further comprises a second magnet disposed between said first pole piece and said lamination stack, and wherein said first spacer extends at least to said first magnet and said second spacer extends at least to said second magnet.

2. The rotor assembly as set forth in claim 1, wherein said sleeve comprises a polymeric material.

3. The rotor assembly as set forth in claim 2, wherein said polymeric material is molded.

4. The rotor assembly as set forth in claim 1, wherein said plurality of pole pieces are separate from said lamination stack.

5. The rotor assembly as set forth in claim 1, wherein said outer sleeve body and said plurality of spacers are unitary.

6. The rotor assembly as set forth in claim 1, wherein said first spacer and said second spacer are disposed between said first magnet and said second magnet.

7. The rotor assembly as set forth in claim 1, wherein said outer sleeve body has an outer sleeve surface facing away from said axis, and wherein said outer sleeve body comprises an aerodynamic feature indented into said outer sleeve surface.

8. The rotor assembly as set forth in claim 1, wherein said lamination stack extends along said axis between a first lamination stack end and a second lamination stack end, and wherein the rotor assembly further comprises a first end cap adjacent to said first lamination stack end and a second end cap adjacent to said second lamination stack end.

9. The rotor assembly as set forth in claim 8, wherein said outer sleeve body has an outer sleeve surface facing away from said axis, wherein said first end cap has a first end cap outer surface facing away from said axis, wherein said second end cap has a second end cap outer surface facing away from said axis, and wherein said outer sleeve surface, said first end cap outer surface, and said second end cap outer surface are flush with one another.

10. The rotor assembly as set forth in claim 8, wherein said lamination stack defines a plurality of channels between said first lamination stack end and said second lamination stack end, and wherein the rotor assembly further comprises a plurality of rods disposed in said plurality of channels.

11. The rotor assembly as set forth in claim 10, wherein said plurality of rods are unitary with said first end cap and said second end cap.

12. The rotor assembly as set forth in claim 10, wherein said plurality of rods are non-magnetic and conductive.

13. The rotor assembly as set forth in claim 10, wherein said plurality of rods comprise carbon fiber.

14. The rotor assembly as set forth in claim 8, wherein said sleeve further comprises a first composition, and wherein at least one of said first end cap and said second end cap comprises a second composition different from said first composition.

15. The rotor assembly as set forth in claim 14, wherein said second composition includes a thermoplastic and a filler encapsulated by said thermoplastic.

16. The rotor assembly as set forth in claim 15, wherein said filler includes carbon fiber.

17. The rotor assembly as set forth in claim 14, wherein said sleeve is molded, and wherein said first and second end caps are molded separately from said sleeve.

18. An electric motor comprising:
   a stator extending along an axis and defining a stator interior; and
   said rotor assembly as set forth in claim 1 disposed in said stator interior.

19. An electric drive unit comprising:
   said electric motor as set forth in claim 18, and
   a gear reduction mechanism coupled to said shaft and configured to modulate torque received from said shaft.

20. A rotor assembly for an electric motor, said rotor assembly comprising:
   a shaft extending along and rotatable about an axis;
   a lamination stack coupled to said shaft and extending along said axis between a first lamination stack end and a second lamination stack end;
   a plurality of magnets comprising a first magnet coupled to said lamination stack;
   a plurality of pole pieces spaced radially outward from said shaft and comprising a first pole piece, wherein said first magnet is disposed between said lamination stack and said first pole piece, and wherein each pole piece of said plurality of pole pieces has an outer pole surface facing away from said axis;
   a sleeve comprising,
      an outer sleeve body disposed about said outer pole surface of each pole piece of said plurality of pole pieces to retain each of said pole pieces with respect to said lamination stack, and
      a plurality of spacers extending from said outer sleeve body radially inward toward said shaft and comprising a first and second spacer, wherein said first and said second spacers are disposed between said first pole piece and said lamination stack to reduce flux leakage of the first magnet; and a first end cap adjacent to said first lamination stack end and a second end cap adjacent to said second lamination stack end;

wherein said sleeve further comprises a first composition, and wherein at least one of said first end cap and said second end cap comprises a second composition different from said first composition; and wherein said second composition includes a thermoplastic and a filler encapsulated by said thermoplastic.

21. A rotor assembly for an electric motor, said rotor assembly comprising:

a shaft extending along and rotatable about an axis;

a lamination stack coupled to said shaft and extending along said axis between a first lamination stack end and a second lamination stack end;

a plurality of magnets comprising a first magnet coupled to said lamination stack;

a plurality of pole pieces spaced radially outward from said shaft and comprising a first pole piece, wherein said first magnet is disposed between said lamination stack and said first pole piece, and wherein each pole piece of said plurality of pole pieces has an outer pole surface facing away from said axis;

a sleeve comprising, an outer sleeve body disposed about said outer pole surface of each pole piece of said plurality of pole pieces to retain each of said pole pieces with respect to said lamination stack, and a plurality of spacers extending from said outer sleeve body radially inward toward said shaft and comprising a first and second spacer, wherein said first and said second spacers are disposed between said first pole piece and said lamination stack to reduce flux leakage of the first magnet; and a first end cap adjacent to said first lamination stack end and a second end cap adjacent to said second lamination stack end;

wherein said sleeve further comprises a first composition, and wherein at least one of said first end cap and said second end cap comprises a second composition different from said first composition; and wherein said sleeve is molded, and wherein said first and second end caps are molded separately from said sleeve.

* * * * *